United States Patent [19]
Johnston et al.

[11] 3,728,412
[45] Apr. 17, 1973

[54] REMOVAL OF ACETYLENES FROM OLEFINIC AND PARAFFINIC HYDROCARBONS

[75] Inventors: Harlin D. Johnston; Dennis L. Ripley, both of Bartlesville, Okla.

[73] Assignee: Phillips Petroleum Company, Bartlesville, Okla.

[22] Filed: Jan. 3, 1972

[21] Appl. No.: 215,169

[52] U.S. Cl. ............................................. 260/677 A
[51] Int. Cl. .............................................. C07c 11/12
[58] Field of Search ..................... 260/677 A, 679 A, 260/676 AD

[56] References Cited

UNITED STATES PATENTS

| | | | |
|---|---|---|---|
| 2,548,619 | 4/1951 | Ray | 260/679 A |
| 1,836,927 | 12/1931 | Lanckh et al. | 260/679 |
| 2,381,707 | 8/1945 | Wood et al. | 260/679 |
| 3,200,167 | 8/1965 | Reich et al. | 260/681.5 |
| 2,381,707 | 8/1945 | Wood et al. | 260/677 |
| 2,693,496 | 11/1954 | Box | 260/677 |
| 2,451,327 | 10/1948 | Fasce et al. | 260/681.5 |
| 2,564,278 | 8/1951 | Ray | 260/677 |

Primary Examiner—Delbert E. Gantz
Assistant Examiner—J. Nelson
Attorney—Quigg and Oberlin

[57] ABSTRACT

A process for the selective removal of acetylenes from olefinic and/or paraffinic hydrocarbons, wherein the hydrocarbons are contacted at elevated temperatures with a supported barium catalyst in the presence of steam.

5 Claims, No Drawings

REMOVAL OF ACETYLENES FROM OLEFINIC AND PARAFFINIC HYDROCARBONS

This invention relates to a catalytic process for the removal of acetylenic impurities from olefinic and/or paraffinic hydrocarbons. In another aspect, this invention relates to a steam-catalytic removal of acetylenic impurities from an olefin concentrate.

In the production of olefinic hydrocarbons by the cracking of hydrocarbon feed streams, certain quantities of acetylenes are produced, the actual amount depending upon such factors as the cracking conditions, and the nature of the feedstock. In preparing the cracking effluent for the prupose of recovering olefinic hydrocarbons, the compounds having less than 3 carbon atoms per molecule are usually contained in the same fraction, the acetylene content usually being in the order of about 2 percent or less. Some ethylene recovery processes, for example, the cuprous salt method, necessitate that the acetylene be first removed from the stream, since acetylene reacts with cuprous ions to form an explosive compound which is easily detonated. Furthermore, ethylene utilized for the purpose of polymerization requires an almost total removal of acetylenes.

Numerous industrial chemical applications exist in which it is necessary to chemically alter one or more members of an organic mixture without significantly affecting other members of the mixture. For example, many catalytic processes have been developed to selectively hydrogenate acetylene in the presence of olefins to olefinic compounds. Generally, these catalyst systems are too active and thereby hydrogenate the acetylene to paraffinic compounds and, additionally, hydrogenate some olefins to paraffinic compounds. Other catalyst systems which have been developed are more selective yet not as active. They convert the acetylenic compounds to olefinic compounds without converting a substantial portion of the olefinic compounds to paraffinic compounds; however, the acetylenic conversion is relatively small. Many of the known catalysts are also difficult to remove from the resulting olefinic compounds, thus creating further impurity problems.

It is an object of this invention to provide an improved catalytic process for the removal of acetylenes from hydrocarbon fractions containing olefins and/or paraffins. It is another object of this invention to provide a catalytic-steam process for the destruction of acetylenes contained in an olefin concentrate, yielding decomposition products such as methane, hydrogen, and carbon dioxide.

In accordance with this invention, a catalytic-steam process has been found which is not only active but also yields a very high degree of selectivity for removal of acetylenes from, for example, olefinic hydrocarbon fractions. The process according to the invention provides for the selective removal of acetylenes from other close boiling olefins and paraffins, particularly for the removal of acetylenes from ethylene and ethane, is achieved through a selective water-gas reaction. Acetylenes which are contained in, for example, $C_1$–$C_4$ paraffinic or olefinic hydrocarbon streams are selectively destroyed by contacting the stream with steam and a suitable catalyst, such as a supported barium catalyst which has water-gas reaction activity.

The inventive process can be applied toward the removal of acetylenes from paraffinic feeds but it is far more important for the removal of acetylenes from olefinic feed streams. In paraffinic streams, there is generally little or no danger of converting the paraffins to other less desirable materials. Hence, relatively severe conditions can be applied in removing the offending acetylenes. On the other hand, in streams which contain substantial amounts of olefins, the matter of selectivity becomes important. The conditions for the removal of acetylenes should not be so severe or non-selective that significant amounts of the more valuable olefins are also lost in the process. The present process shows a relatively high degree for such selectivity.

The inventive process according to the invention is particularly advantageous when applied for the removal of acetylenes from streams which also contain ethylene. However, it can also be used to remove acetylenic impurities from streams containing either olefins or paraffins which have 1 to 4, preferably 2 to 3 carbon atoms per molecule. Thus, acetylenic compounds such as acetylene, 1-butene, vinylacetylene, ethylacetylene, and the like are removed from streams which also contain olefins and paraffins such as methane, ethylene, ethane, propylene, propane, butene-1, butene-2, butane, and mixtures thereof. In streams containing compounds having 4 carbon atoms per molecule, it has been found that these compounds such as 1,2-butadiene have also been removed by the process of the present invention.

A suitable catalyst according to the process of the invention, for example, barium-impregnated calcium aluminate can be used wherein the ratio of aluminum to calcium need not be exactly stoichiometric. The aluminum to calcium ratio of such a calcium aluminate support can generally be in the range of 2.2–1.6. However, calcium aluminates containing a small excess of calcium have been found to be particularly effective. Thus, aluminum to calcium ratios in the range of 1.95–1.80 are particularly preferred.

The barium catalyst according to the inventive process is comprised of from about 1 to about 10 percent by weight barium and a support selected from calcium aluminate, alumina, calcium oxide, and mixtures thereof. The preferred concentration of barium promoter is about 3.5 to 5.0 percent by weight of the supported barium catalyst. The preferred catalyst according to the process of the invention is barium-impregnated calcium aluminate.

Any suitable barium-containing catalyst which also contains calcium aluminate, alumina, or calcium oxide can be used according to the invention. These catalysts can be prepared by any conventional methods such as dry mixing, coprecipitation, or by impregnation. The catalysts presently preferred are those prepared by impregnation of a suitable support material with a soluble barium compound such as barium acetate, barium nitrate, and the like. The support material should be of catalytic quality and should have a surface area of at least about 1 square meter per gram. The catalyst is activated prior to use in the process by heating at a temperature of from 900° to 1500° F. for 0.1 to 24 hours. The heating can be carried out in air and can be followed, if desired, by additional heating and other gases such as hydrogen, nitrogen, and the like. When regeneration of the catalyst is required, the above-described activation procedure is essentially repeated.

The process of the present invention is carried out by contacting the acetylene-containing stream with the barium-containing catalyst at 500°–1200° F., preferably 950°–1100° F. Any convenient pressure can be used but relatively low pressures are preferred, for example, pressures of 0–100 psig. A continuous mode of operation wherein the gaseous feed stream is passed through a fixed or fluidized bed of the catalyst is presently preferred. The space rates will generally depend upon the catalyst, the feed, and the temperature, but will generally be in the range of 50–5000 GHSV. Steam is essential to the process and the steam:hydrocarbon ratio in the reaction zone is in the range of 0.1:1 to 10:1 by volume.

EXAMPLE I

A 202 g quantity of a finely divided flame-hydrolyzed alumina (Alon C from Cabot Corporation) was dispersed in 2 liters water to which 200 g of powdered calcium carbonate was added forming a thick paste. The paste was thoroughly mixed and dried at 110° C. for 4 hours, then ground to less than 35 mesh and tableted to one quarter inch tablets using 10 wt. % powdered polyethylene as a lubricant. The tablets were then heated at 1100° F. in air for 4 hours to remove the lubricant, then heated at 1600° F. to form a calcium aluminate having an Al/Ca atomic ratio of about 2.0.

These tablets were crushed to 20–40 mesh, then impregnated with sufficient barium acetate solution to give a 4 wt. percent barium content in the final catalyst. The impregnated catalyst was dried at 110° C. for 2 hours then calcined in air at 1100° F. for 3 hours.

The above-described catalyst was charged into a fixed bed tubular reactor, then contacted with a flowing stream of ethylene which contained 1.1 mole percent acetylene. The hydrocarbon space rate was 2000 GHSV and the steam:hydrocarbon volumetric ratio was 2.2:1. The pressure in the reaction zone was essentially atmospheric.

The results of this run and of several other runs at different operating temperatures are shown in Table I below. In addition, a number of other similar catalysts in which the atomic ratio of aluminum to calcium was varied are also shown.

TABLE I

Acetylene Removal from Ethylene Stream over 4 wt. % Ba on Calcium Aluminate Catalyst at Various Temperatures and with Varying Al/Ca Ratios

| Run | Al/Ca Ratio | Temp. °F | % Ethylene Converted | % Acetylene Removed |
|---|---|---|---|---|
| 1 | 2.2 | 900 | 0.0 | 47.4 |
| 2 | 2.2 | 1000 | 0.0 | 89.3 |
| 3 | 2.2 | 1100 | 0.2 | 99.5 |
| 4 | 2.1 | 900 | 0.0 | 38.0 |
| 5 | 2.1 | 1000 | 0.0 | 82.4 |
| 6 | 2.1 | 1100 | 0.3 | 99.3 |
| 7 | 2.0 | 900 | 0.0 | 36.7 |
| 8 | 2.0 | 1000 | 0.0 | 91.0 |
| 9 | 2.0 | 1100 | 0.3 | 98.7 |
| 10 | 1.9 | 900 | 0.0 | 58.8 |
| 11 | 1.9 | 1000 | 0.0 | 92.0 |
| 12 | 1.9 | 1100 | 0.3 | 99.7 |
| 13 | 1.8 | 900 | 0.0 | 67.3 |
| 14 | 1.8 | 1000 | 0.0 | 96.9 |
| 15 | 1.8 | 1100 | 0.2 | 99.9 |
| 16 | 1.7 | 900 | 0.0 | 67.3 |
| 17 | 1.7 | 1000 | 0.1 | 94.1 |
| 18 | 1.7 | 1100 | 1.4 | 97.8 |

The data in the above table show that the invention process is capable of removing significant amounts of acetylene from the ethylene stream at several different temperatures. At 1100° F., essentially all of the acetylene was removed under these conditions. Also noteworthy is the fact that only extremely small amounts of ethylene were lost. The data also show that aluminum/calcium ratios of about 1.8–1.9 (a slight excess of calcium) in the calcium aluminate-containing catalysts were somewhat more active.

EXAMPLE II

A 20 g quantity of a hard commercial catalytic alumina (12–20 mesh particles) was impregnated with 10 ml of a solution prepared by mixing 50 ml water with 10 g barium acetate. The impregnated alumina was dried at 110° C. for 2 hours then calcined at 1100° F. in air for 4 hours.

In a manner similar to that of Example I, the catalyst was charged into a fixed bed tubular reactor and contacted with an ethylene stream which contained 2.0 mole percent acetylene. The hydrocarbon rate was 1800 GHSV, the steam:hydrocarbon ratio was 2:1, the temperature was 1100° F., and the pressure was atmospheric.

Analysis of the effluent showed that 99.8 percent of the acetylene had been converted but only about 0.2 percent of the ethylene was destroyed.

After leaving the reaction zone, the deacetylenated stream can be subjected to any suitable separation means, such as fractionation, to isolate and recover the desired product such as olefinic products. Depending upon the original acetylenes content, the reaction stream will contain varying amounts of the decomposition products such as methane, carbon dioxide, hydrogen, and traces of carbon monoxide. If necessary, the trace amounts of carbon monoxide can be removed by selective absorption. The other decomposition products can be removed by fractionation. The steam can be readily separated by condensation and recycled.

The foregoing example has illustrated a preferred process of carrying out the desired purpose, i.e., removal of acetylenes, from an ethylene concentrate, but it should be well understood that various and obvious changes may be made by those skilled in the art without departing from the scope of the invention as defined by the following claims.

What we claim is:

1. A process for the selective removal of acetylenes from a hydrocarbon fraction containing said acetylenes and at least one of paraffins and olefinic hydrocarbons, comprising: introducing said hydrocarbon fraction into contact with steam and a catalyst comprising barium on a support containing a material selected from the group consisting of calcium aluminate, alumina and calcium oxide to remove said acetylene from said fraction and recovering the contacted fraction.

2. The process according to claim 1 wherein the supported, barium promoted catalyst is comprised of about 1 to about 10 percent by weight barium and a support selected from the group consisting of calcium aluminate, alumina, calcium oxide, and mixtures thereof.

3. The process according to claim 1 wherein the hydrocarbon fraction is comprised of a cracker-ethylene concentrate containing said acetylenes, paraffins, and olefinic hydrocarbons having from 1 to 4 carbon atoms per molecule.

4. The process according to claim 1 wherein the steam to hydrocarbon ratio is from 0.1:1 to 10:1 by volume.

5. The process according to claim 1 wherein acetylene is selectively removed from ethylene concentrate, comprising: contacting said concentrate with 3.5 to 5.0 percent by weight barium promoted catalyst supported by calcium aluminate in the presence of steam at an approximate ratio of from 0.1:1 to 10:1 steam to hydrocarbon by volume, a temperature of about 1100°F.; and removing from the ethylene concentrate carbon monoxide, carbon dioxide and water formed by the selective destruction of acetylenes.

* * * * *